(12) United States Patent
Baarman

(10) Patent No.: US 7,306,716 B2
(45) Date of Patent: Dec. 11, 2007

(54) WATER TREATMENT SYSTEM

(75) Inventor: David W. Baarman, Fennville, MI (US)

(73) Assignee: Access Business Group International LLC, Ada, MI (US)

( * ) Notice: Subject to any disclaimer, the term of this patent is extended or adjusted under 35 U.S.C. 154(b) by 447 days.

(21) Appl. No.: 10/869,515

(22) Filed: Jun. 16, 2004

(65) Prior Publication Data

US 2005/0279679 A1    Dec. 22, 2005

(51) Int. Cl.
*C02F 1/32* (2006.01)
(52) U.S. Cl. .................. 210/143; 210/192; 210/295; 250/435
(58) Field of Classification Search ............. 210/143, 210/192, 295; 250/435
See application file for complete search history.

(56) References Cited

U.S. PATENT DOCUMENTS

| | | | |
|---|---|---|---|
| 4,017,735 A | 4/1977 | Siegel | |
| 4,625,119 A | 11/1986 | Murdock, III | |
| 4,740,706 A | 4/1988 | Murdock, III | |
| 4,755,292 A | 7/1988 | Merriam | |
| 4,849,100 A | 7/1989 | Papandrea | |
| 4,909,931 A | 3/1990 | Bibi | |
| 4,969,991 A | 11/1990 | Valadez | |
| 5,008,548 A | 4/1991 | Gat | |
| 5,106,495 A | 4/1992 | Hughes | |
| 5,147,532 A | 9/1992 | Leek, Jr. | |
| 5,266,215 A | 11/1993 | Engelhard | |
| 5,324,423 A | 6/1994 | Markham | |
| 5,366,705 A | 11/1994 | Reidy | |
| 5,393,419 A | 2/1995 | Tiede et al. | |
| 5,445,729 A | 8/1995 | Monroe et al. | |
| 5,459,030 A | 10/1995 | Lin et al. | |
| 5,466,425 A | 11/1995 | Adams | |
| 5,484,538 A | 1/1996 | Woodward | |
| 5,567,311 A | 10/1996 | Jang | |
| 5,591,978 A | 1/1997 | Kovalsky et al. | |
| 5,618,662 A | 4/1997 | Lin et al. | |
| 5,628,895 A | 5/1997 | Zucholl | |
| 5,653,877 A | 8/1997 | Mark | |
| 5,658,530 A | 8/1997 | Dunn | |
| 5,676,824 A | 10/1997 | Jeon et al. | |
| 5,698,091 A | 12/1997 | Kuennen et al. | |
| 5,709,991 A | 1/1998 | Lin et al. | |
| 5,720,304 A | 2/1998 | Omura | |
| 5,738,780 A | 4/1998 | Markham | |
| 5,776,339 A | 7/1998 | Ha et al. | |
| 5,785,845 A | 7/1998 | Colaiano | |
| 5,814,212 A | 9/1998 | Hsu | |

(Continued)

FOREIGN PATENT DOCUMENTS

FR    2 790 818 A1    4/1998

(Continued)

*Primary Examiner*—Terry K Cecil
(74) *Attorney, Agent, or Firm*—Warner Norcross & Judd LLP

(57) ABSTRACT

A water treatment system has a battery rechargeable by a manual generator, thus eliminating the need for an external power source. The water treatment system uses the rechargeable battery to power a pump and a UV lamp. After the water passes through a filter, the UV lamp treats the water being pumped through the apparatus. The system optionally includes a flashlight, also powered by the rechargeable battery.

13 Claims, 6 Drawing Sheets

U.S. PATENT DOCUMENTS

| | | |
|---|---|---|
| 5,837,197 A | 11/1998 | Porrazzo et al. |
| 5,843,309 A | 12/1998 | Mancil |
| 5,853,752 A | 12/1998 | Kuennen et al. |
| 5,874,741 A | 2/1999 | Matschke |
| 5,900,143 A | 5/1999 | Dalton et al. |
| 5,900,212 A | 5/1999 | Maiden et al. |
| 5,915,161 A | 6/1999 | Adams |
| 6,139,726 A | 10/2000 | Greene |
| 6,182,453 B1 | 2/2001 | Forsberg |
| 6,375,833 B1 | 4/2002 | Marston et al. |
| 6,491,868 B2 | 12/2002 | Kuennen et al. |
| 7,090,779 B2 * | 8/2006 | Bernstein et al. ........... 210/748 |
| 2006/0163126 A1 * | 7/2006 | Maiden ....................... 210/87 |

FOREIGN PATENT DOCUMENTS

| | | |
|---|---|---|
| GB | 1421804 A  * | 1/1976 |
| WO | WO 2004028290 | 4/2004 |

* cited by examiner

WATER TREATMENT SYSTEM

BACKGROUND OF THE INVENTION

The present invention relates to water treatment systems and more specifically to portable water treatment systems.

Water treatment systems may remove pathogens, chemical contaminants and turbidity from water. In some water treatment systems, a filter is used to remove particulates and an ultraviolet (UV) lamp is used to irradiate the water. A pump is often used to propel water through the systems.

The operation of such a water treatment system using a lamp requires electricity. However, water treatment systems are often needed in areas where electricity is not provided. Water treatment systems have been developed for use where electric power may not be available.

One such water treatment system is shown in U.S. Pat. No. 4,849,100 for "Portable Water Treatment subsystem," which issued to Papandrea. The water treatment system includes a particulate filter, a UV reactor and a de-calcification unit. The system receives power from either an AC outlet or a 12 V DC power source. Although the system is relatively small, the system is transported in a disassembled state and must be assembled at the time of use. Further, the system requires a separate electric power source.

Another portable water treatment system is shown in U.S. Pat. No. 5,900,212 for "Hand-held Ultraviolet Water Purification System," which issued to Maiden et al. The Maiden system is directed to a water treatment system having a UV lamp for treating water. The system includes a 3.4 volt rechargeable lithium battery to function as a power source. The Maiden system is designed to provide a UV lamp that can be submerged in standing water, for example, in a canteen or bucket, to subject the water to UV light.

Although conventional portable water treatment systems are capable of removing unwanted chemicals, pathogens and other contaminants from water, they have shortcomings. First, conventional water treatment systems must be connected to a power source to provide power to the UV lamp. If the system includes a battery, the system is unusable until the battery is recharged or a new battery is obtained. Second, the units are relatively large. These systems are usually too large to fit in a conventional backpack or handbag. This can be a significant problem when a user has to transport the system a considerable distance. Finally, if the water system is connected to a battery, the battery may fail to adequately power the UV lamp such that the water is not properly irradiated.

An improved water treatment system to overcome these shortcomings is therefore highly desirable.

DETAILED DESCRIPTION OF THE DRAWINGS

Figure 1:
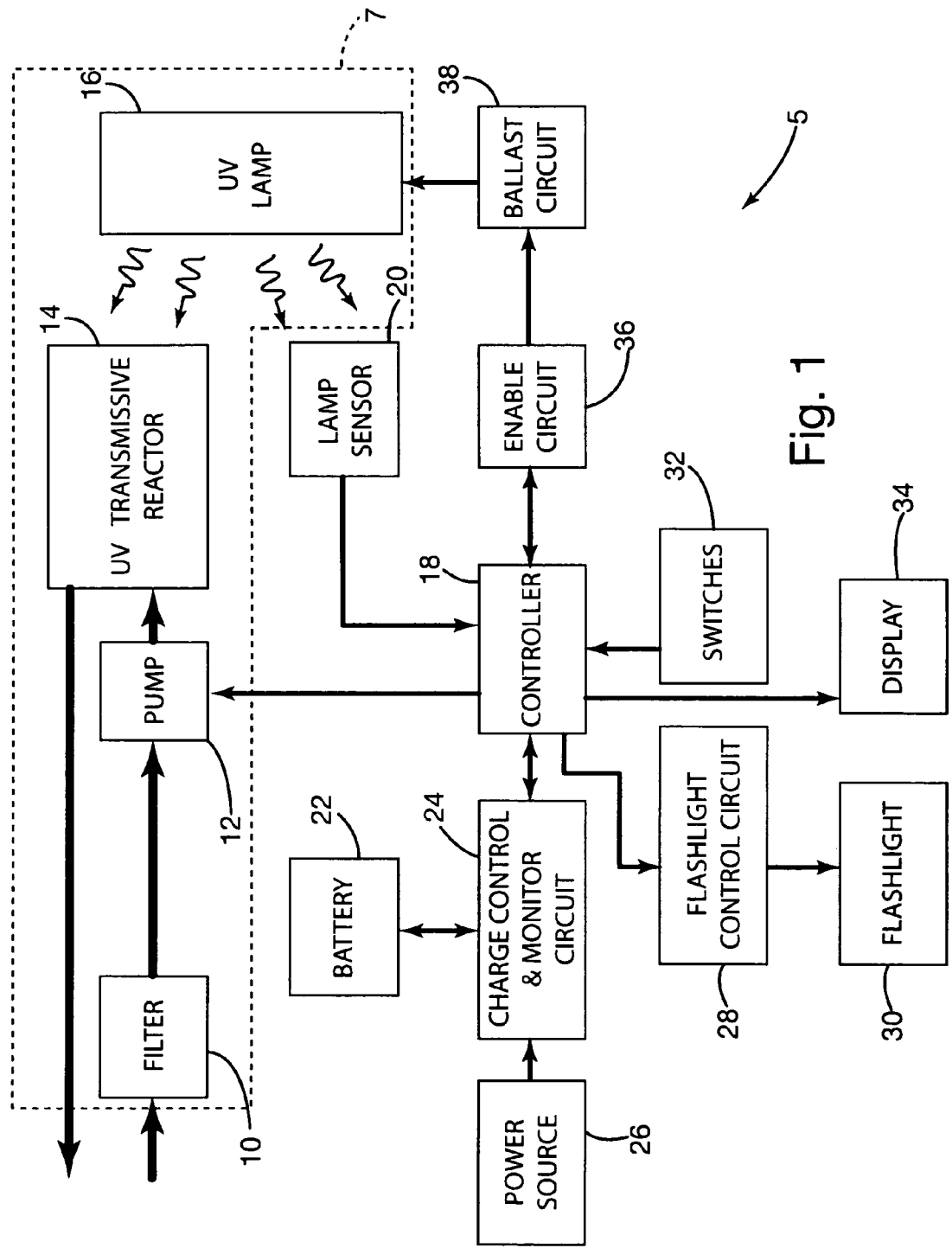
FIG. 1 is a block diagram of a water treatment system.

FIG. 1 is a functional block diagram for water treatment system 5. Filter 10, UV transmissive reactor 14 and UV lamp 16 form treatment subsystem treatment subsystem for water treatment system 5. Water first enters the system and passes through filter 10. Filter 10 may be any filter capable of removing contaminants from water, such as a carbon filter. Pump 12 moves the water through the system. Pump 12 is preferably a DC (direct current) pump. Pump 12 could be contained within the housing or part of the inlet assembly. After water leaves pump 12, it then passes to UV transmissive reactor 14. Light from UV lamp 16 decontaminates the water in UV transmissive reactor 14. The water then leaves the water treatment system.

Controller 18 regulates the operation of water treatment system 5. Controller 18 could be a microcontroller or a microprocessor. If controller 18 were a microcontroller, external memory and other supporting circuitry could be provided.

Controller 18 controls pump 12 so that water has sufficient time in UV transmissive reactor 14 to be irradiated. Lamp sensor 20 provides information to controller 18 as to the operational characteristics of UV lamp 16. If lamp sensor 20 detects that UV lamp 16 is not operating with sufficient intensity, controller 18 will disable pump 12 to stop further attempts to treat water. In some applications, water treatment system 5 could optionally operate without a functioning UV lamp 16, providing the user with filtered water.

Charge storage device 22, which could be rechargeable, provides power for water treatment system 5. Charge storage device 22 could be comprised of a dry-cell battery, a wet-cell battery, a capacitor, a super capacitor, or other electric charge storage. Charge control circuit 24 monitors charge storage device 22 as well as power source 26. Charge control circuit 24 provides information regarding the status and type of charge storage device 22 to controller 18.

Charge control circuit 24 also monitors the status of power source 26. Power source 26 could be a hand crank electric generator having a dynamo, a spring generator, a solar power cell, fuel cell, a DC power source, or an AC power source. If excess power is available from power source 26, charge control circuit 24 determines whether charge storage device 22 could be further charged. If so, charge control circuit 24 could allow charging of charge storage device 22.

To perform this function, a memory either internal to or coupled to controller 18 could contain the power requirements to operate UV lamp 16 and pump 12. By comparing the power provided by power source 26, controller 18 can determine whether sufficient power was present to operate UV lamp 16 and pump 12 and simultaneously replenish charge storage device 22.

Controller 18 is also connected to flashlight control circuit 28. Flashlight control circuit 28 is connected to flashlight 30. If controller 18 receives a signal from, for example, one of switches 32 (described below) to energize flashlight 30, controller 18 determines whether sufficient power is available from charge storage device 22. If sufficient power is available, then controller 18 enables flashlight control circuit 28 to energize flashlight 30. If sufficient power is not available, flashlight 30 is not energized.

Display 34 provides information about the operation of water treatment system 5. Display could be a liquid crystal display (LCD), a series of light emitting diodes (LEDs), an audible enunciator, or some other device capable of providing information to a user. Display 34 is optional and can be eliminated in some applications. Switches 32 allow a user to send a variety of commands to controller 18, such as "turn on flashlight" or "purify water." The controller can also have preset timing as to UV on-time vs. dose and the microcontroller can allow proper UV time-on before pumping water. It is known that UV intensity increases as the lamp warms up, the microprocessor can assure a better point on this curve with or without a light sensor.

Controller 18 is also coupled to lamp enable circuit 36. Lamp enable circuit 36 controls ballast circuit 38. Ballast circuit 38 is any of the many well known circuits for energizing UV lamps.

Figure 2:
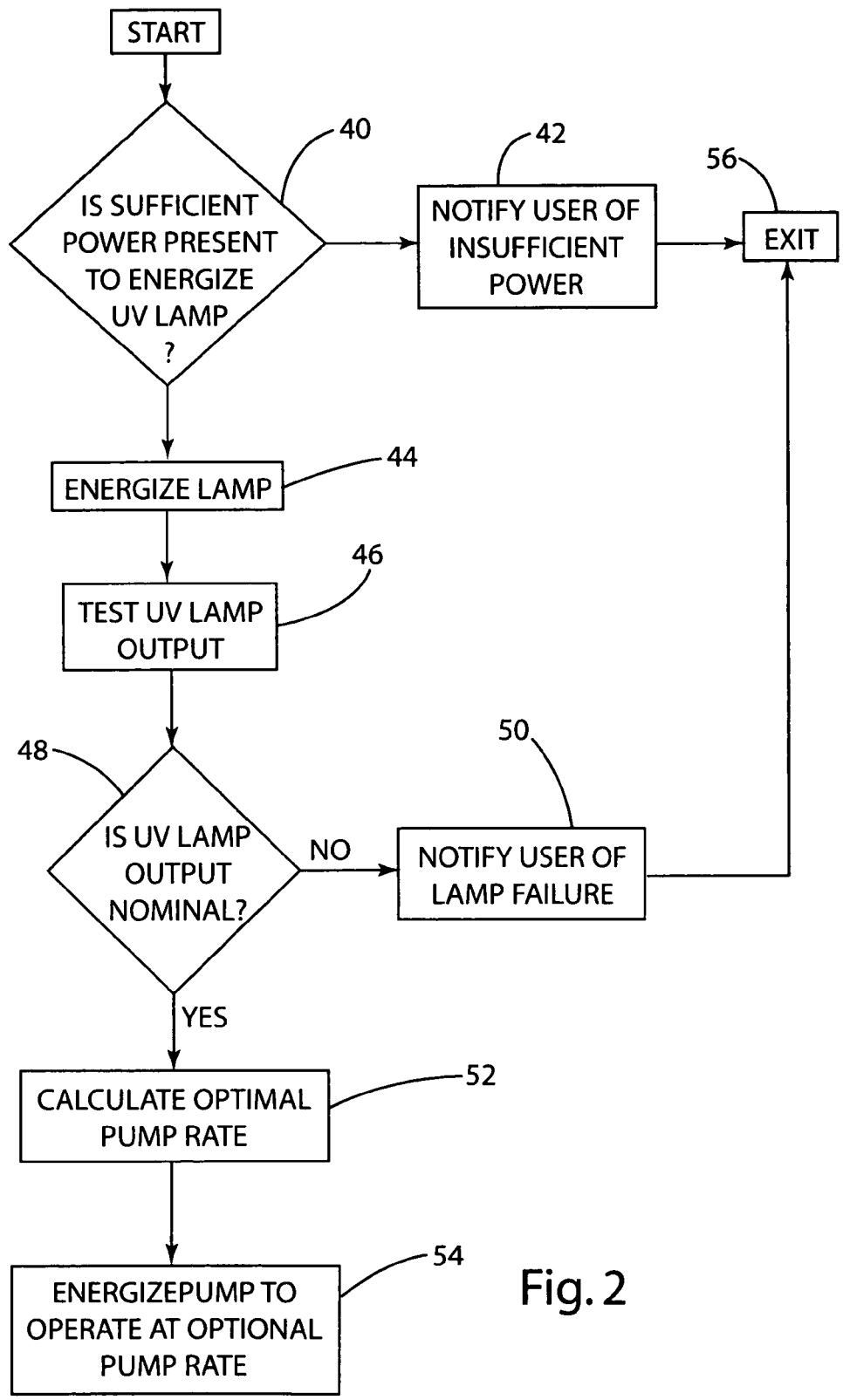
FIG. 2 is a flowchart showing the operation of the water treatment system.

FIG. 2 shows a method of operating a water treatment system. After the system is started by the user activating switches 32, controller 18 determines whether sufficient power is present to energize UV lamp 16 and to operate pump 12 and any other devices currently operating. Step 40. If sufficient power is not present the user is notified of the lack of power and the process terminates. Step 42. The process is then ended and the display indicated this to the user. Step 56.

If sufficient power is present, then the lamp is energized. Step 44. The UV lamp output is then tested 46 by lamp sensor 20. If the sensor is not used the design will have appropriate design margins to assume the lamp is on via current sensor and wait the designated warm up period to assure intensity level. Step 48. If the UV lamp output or lamp current is not sufficient, then the user is notified of a lamp failure. Step 50. The process is then ended. Step 56. Alternatively, a user could manually override the lamp failure and enable operation of the system.

On the other hand, if UV lamp output is sufficient, then a pump rate is calculated based upon the UV lamp output. Step 52. The pump is then energized to operate at the appropriate rate. Step 54. In one embodiment, about 8 watts of power is required to energize the lamp or 250 mA for a 36 milliliter reactor at a flow rate of about 0.8 gallons per minutes. Slower flow rates and lower currents can be used to conserve power and extend use.

Figure 3:
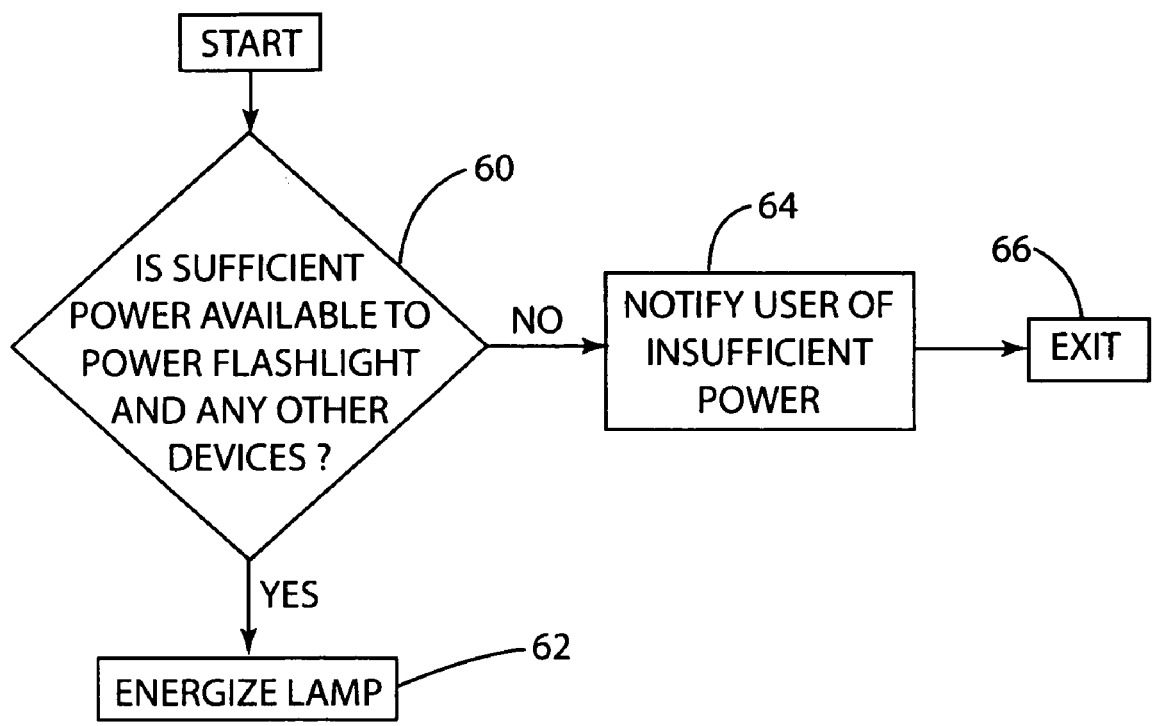
FIG. 3 is a flowchart showing another aspect of the operation of the water treatment system.

FIG. 3 shows the operation of flashlight 30. The available power is checked. Step 60. If sufficient power is available to power flashlight and any other devices currently operating, then the flashlight is energized. Step 62. If not, then the user is notified of insufficient power. Step 64. The process then ends. Step 66.

Figure 4:
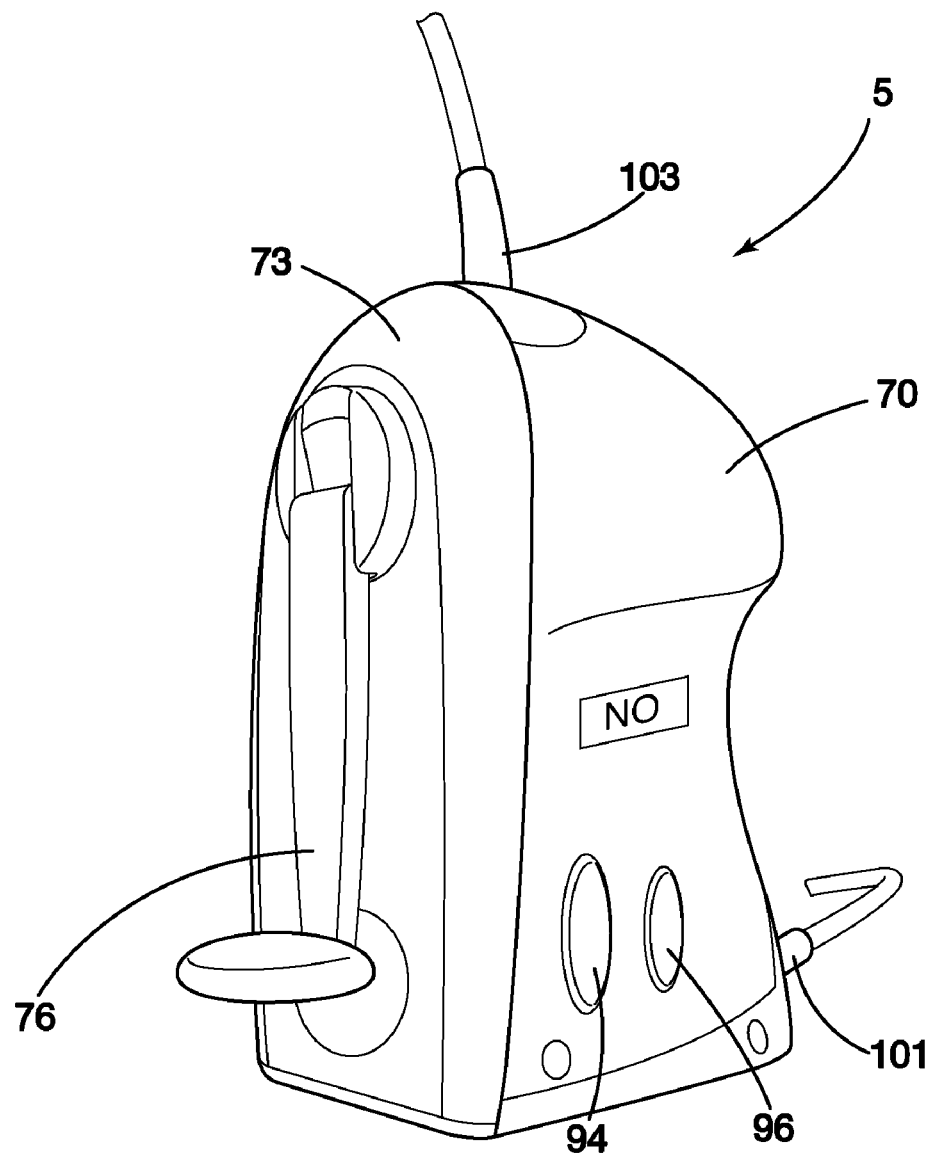
FIG. 4 is a perspective view of a portable water treatment system according to a preferred embodiment of the present invention.

FIG. 4 shows water treatment system 5. In the illustrated embodiment, water treatment system 5 includes inlet 101 for providing water to the system, outlet 103 for dispensing water from the system and charging crank 76 for supplying power to water treatment system 5. Case 70 and face 73 form a housing to contain water treatment system 5. Water treatment system 5 of the present invention can be manually recharged, eliminating the need for an external electric source to charge the system.

Water control switch 94 controls the pumping of water through system 10. Light switch 96 controls flashlight 72.

Figure 5:
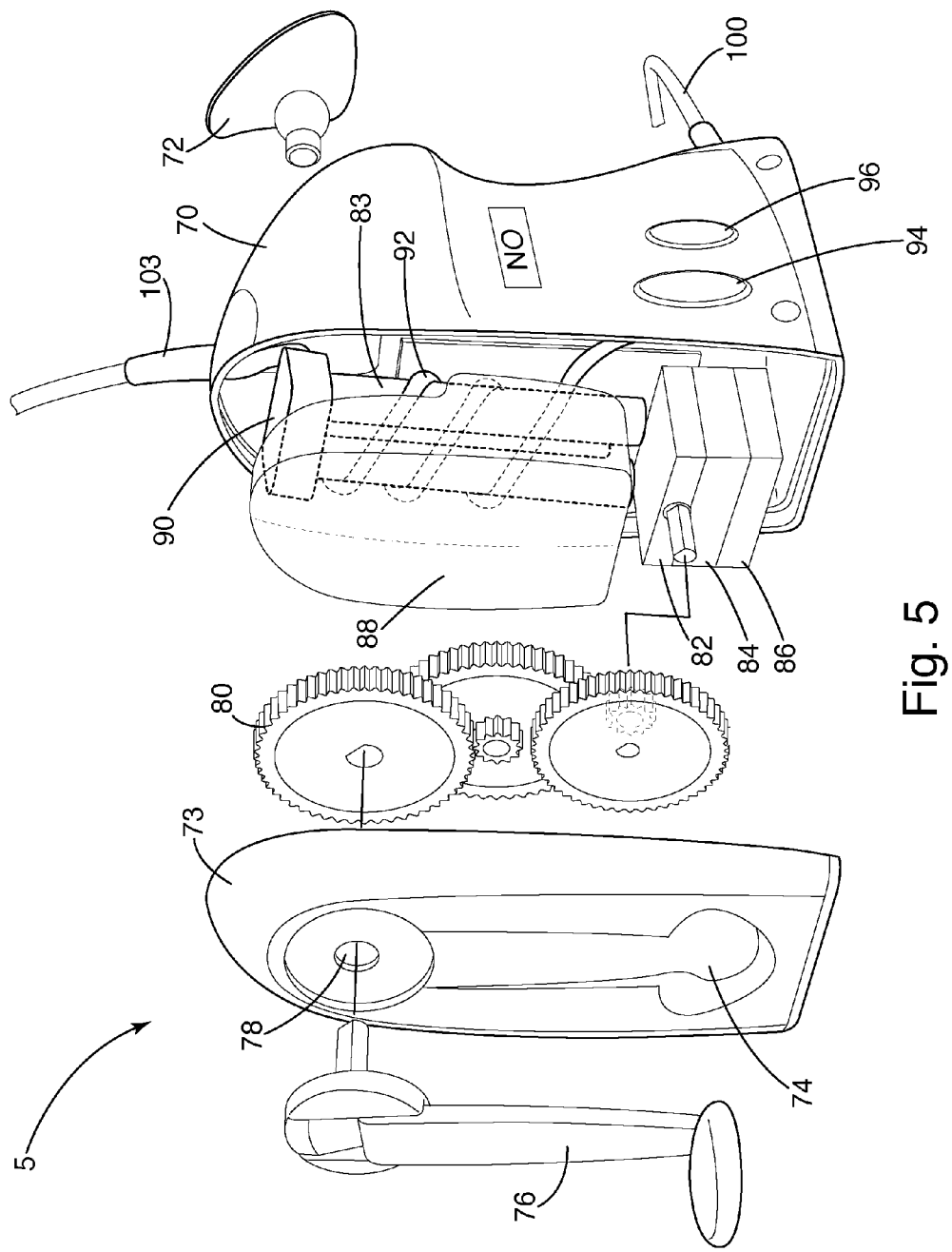
FIG. 5 is an exploded view of the water treatment system.

FIG. 5 is an exploded view of water treatment system 5. Flashlight 72 can be used independently of the other components of water treatment system 5. Case 70 could be constructed of reinforced plastic.

Face 73 includes crank cavity 74. Crank 76 is preferably housed within the crank cavity 74 when crank 76 is not in use. Crank 76 fits through port 78 to engage gears 80. Reflector 88 fits around UV lamps 83 to increase the exposure of UV transmissive reactor 14 to the output of UV lamps 83.

Charger 82 is connected to generator 84. Charger 82 could be connectable to an external AC or DC power source, such as a wall outlet, a solar cell or battery. Generator 84 is a manually chargeable generator. Crank 76 is operationally engaged with generator 84. Generator 84 can be any conventional manual generator, such as the manual generators disclosed in U.S. Pat. No. 6,133,642 to Hutchinson and U.S. Pat. No. 6,472,846 to Hutchinson et al, which are incorporated herein by reference in their entirety. Alternatively, the generator could be foot-actuated as well as hand cranked.

When turned, crank 76 powers generator 84. In one embodiment, generator 84 transfers a charge to charger 82, which in turn charges battery 86. In another embodiment, generator 84 could be used to directly power the system. Crank 76 can be returned to crank cavity 74 after use. Alternatively, each of these power systems may be used remotely with the water treatment system. In another alternative, crank 76 would be used to mechanically power pump 104.

Figure 6:
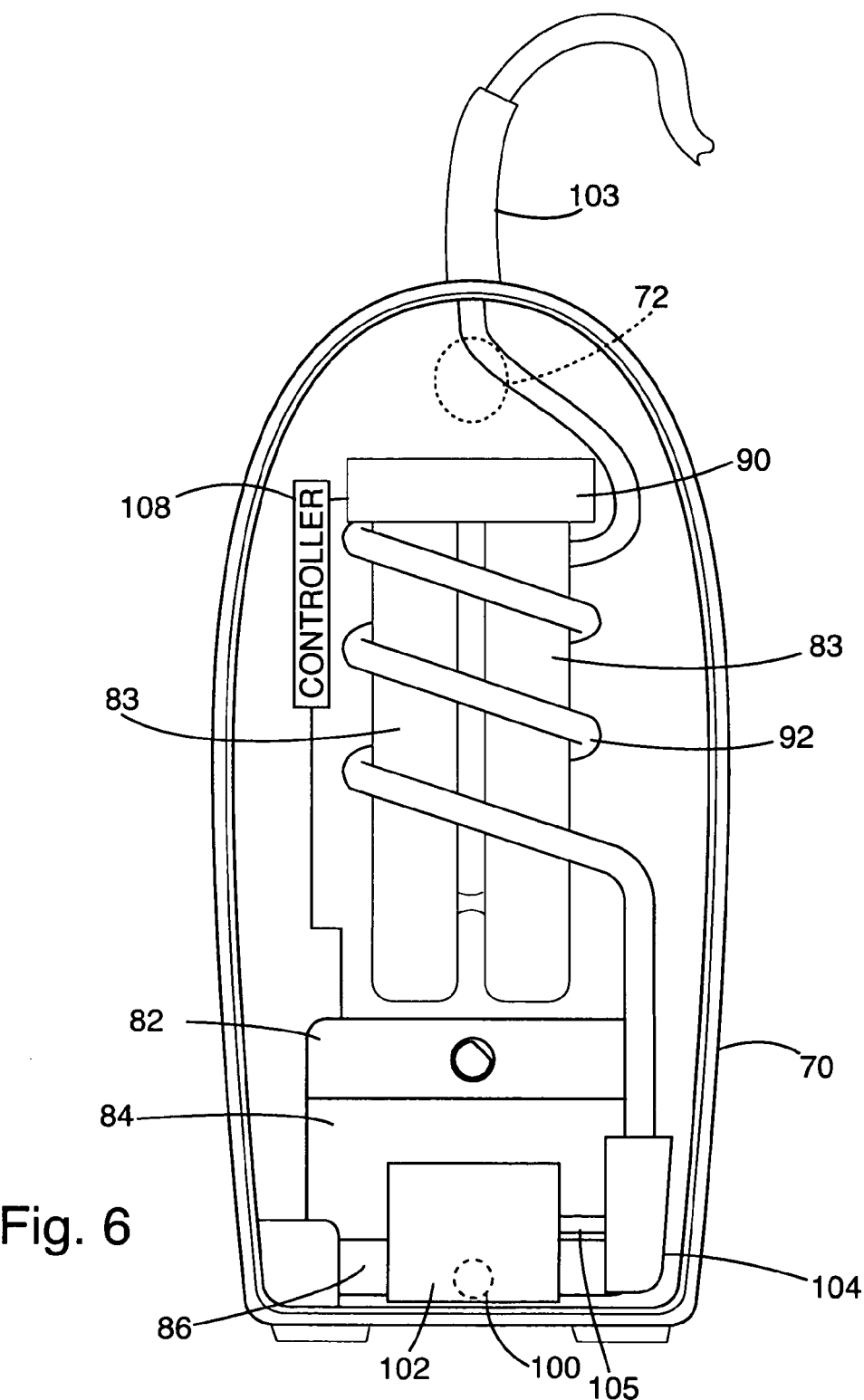
FIG. 6 is a cross-sectional view of the water treatment.

Referring to FIG. 6, case 70 contains filter 102, pump 104, coil 92 and UV lamps 83. Water passes through inlet 100 and through filter 102. Filter 102 may be any filter capable of removing contaminants from water, such as a carbon filter. Water moves from filter 102 to pump 104 by way of pipe 105. Pump 104 may have different operating speeds.

Coil 92 may be directly connected to pump 104 or may be connected to pump 104 by additional tubing. Coil 92 preferably is circumferentially disposed about UV lamps 83. Coil 92 can be constructed of any UV transparent material, such as soft glass, Quartz or polytetrafluoroethylene (more commonly known as Teflon). Reflector 88, shown in FIG. 5, may be used to increase the exposure of the water in coil 92 to the light from UV lamps 83.

UV lamps 83 are connected to ballast 90. Controller 108 is connected to ballast 90 and controls the powering of UV lamps 83. To control the water passing through the system, controller 108 is also connected to pump 104. Controller 108 may be connected to flashlight 72.

Controller 108 preferably is connected to water control switch 94 and light switch 96 located on case 70. Switches 94, 96 allow the user to select between two or more operation modes. Switches 94, 96 could be moved between multiple operation modes.

For example, system 5 could additionally operate as a night light, or emergency flasher.

Controller 108 preferably is programmed to distribute power appropriately between flashlight 72, pump 104, charger 82 and UV lamps 83. Controller 108 could distribute necessary power to all of the devices, or it could power devices based upon their priority.

Water control switch 94 would signal the controller 108, which in turn would signal pump 104 to pump water. Similarly, light switch 96 has at least an "on" position and an "off" position. If flashlight 72 includes multiple lights or multiple modes, such as a flash mode, light switch 96 may include positions to actuate these alternative functions.

Flashlight 72 could be connected to a light control circuit. The light control circuit may be programmed to power light 110 in multiple modes, such as a flash mode. Alternatively, the light control circuit could power a plurality of lights.

Inlet tube 101 is placed in a water source such as a stream, a pond, a lake, a river, or any other source of water, including a sink or bathtub containing water. Pump 104 draws the water through inlet tube 101 into filter 102. The pump may also be located within or at the end of the inlet tube. Filter 102 removes contaminants from the water. Water is then pumped through coil 92, exposing the water to UV light from UV lamps lamp 83. The UV lamps deactivate microorganisms and bacteria in the water.

If pump 104 has variable speeds, the user selects the pump speed using the water control switch 94. The water is dispensed via outlet tube 103.

The above description is of the preferred embodiment. Various alterations and changes can be made without departing from the spirit and broader aspects of the invention as defined in the appended claims, which are to be interpreted in accordance with the principles of patent law including the doctrine of equivalents. Any references to claim elements in the singular, for example, using the articles "a," "an," "the," or "said," is not to be construed as limiting the element to the singular.

The embodiments of the invention in which an exclusive property or privilege is claimed are defined as follows:

1. A water treatment system comprising:
   a pump for moving water through the water treatment system;
   an ultraviolet transmissive reactor;
   an ultraviolet lamp for irradiating the water;
   a battery for powering the pump and the ultraviolet lamp;
   a manual charger for charging the battery; and
   a controller coupled to the pump, the battery, and a battery charge monitoring circuit, whereby the controller receives information from the monitoring circuit and prohibits energizing the pump if the battery has insufficient power to energize the ultraviolet lamp at a desired intensity.

2. The water treatment system of claim 1 further comprising a lamp sensor for sensing light from the ultraviolet lamp.

3. The water treatment system of claim 2 further comprising a ballast circuit for energizing the ultraviolet lamp.

4. The water treatment system of claim 3 further comprising an enable circuit for energizing the ballast circuit.

5. The water treatment system of claim 4 further comprising the battery monitor circuit coupled to the battery.

6. The water treatment system of claim 5 further comprising a flashlight.

7. The water treatment system of claim 6 further comprising a flashlight control circuit for energizing the flashlight.

8. The water treatment system of claim 7 further comprising a filter.

9. The water treatment system of claim 8 further comprising a battery charge circuit responsive to a power source to allow charging of the battery by the power source if the battery is below a maximum charge.

10. The water treatment system of claim 9 where the battery charge circuit prohibits further charge of the battery if the battery is at the maximum charge.

11. The water treatment system of claim 10 where the controller enables the flashlight control circuit to energize the ultraviolet lamp if the power source is operational.

12. The water treatment system of claim 11 where the pump has variable speeds.

13. A water treatment system comprising:
   a housing;
   a treatment subsystem treatment section contained within the housing, the treatment section treatment subsystem including a UV lamp;
   a battery for powering the treatment section treatment subsystem;
   a charger contained within the housing and connected to the battery;
   a battery charge monitoring circuit connected to the battery;
   a manual generator connected to the charger;
   a controller for regulating the operation of the water treatment system wherein the charger is coupled to the controller;
   a lamp monitor for monitoring the UV lamp wherein the lamp monitor is coupled to the controller;
   a pump for moving water through the water treatment system, wherein the pump is coupled to the controller; and
   a power source, wherein the controller selectively provides power to the charger from the power source in response to information received from the battery charge monitoring circuit.

* * * * *